US007849998B2

(12) United States Patent
Langlois et al.

(10) Patent No.: US 7,849,998 B2
(45) Date of Patent: Dec. 14, 2010

(54) CONTAINER SWITCHING DEVICE

(75) Inventors: Pierre-Francois Langlois, Octeville sur Mer (FR); Pierre Heuzebroc, Octeville sur Mer (FR); Daniel Nguyen Van, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 11/915,986

(22) PCT Filed: Dec. 19, 2006

(86) PCT No.: PCT/FR2006/002793

§ 371 (c)(1),
(2), (4) Date: Nov. 29, 2007

(87) PCT Pub. No.: WO2007/077320

PCT Pub. Date: Jul. 12, 2007

(65) Prior Publication Data

US 2009/0014284 A1    Jan. 15, 2009

(30) Foreign Application Priority Data

Dec. 26, 2005   (FR) .................................. 05 13334

(51) Int. Cl.
B65G 25/00   (2006.01)
(52) U.S. Cl. ................................ 198/803.9; 198/470.1
(58) Field of Classification Search .............. 198/803.9, 198/440, 441, 459.2, 370.01, 377.03, 377.07, 198/397.02, 449, 450, 470.1, 803.3, 803.4, 198/803.7, 351, 353, 355
See application file for complete search history.

(56) References Cited

U.S. PATENT DOCUMENTS 2,985,008 A  *  5/1961  Renard ........................ 73/45.2

(Continued)

FOREIGN PATENT DOCUMENTS

DE       28 48 215 A1     5/1980

(Continued)

OTHER PUBLICATIONS

French Preliminary Search Report dated Sep. 14, 2006.

*Primary Examiner*—Gene Crawford
*Assistant Examiner*—William R Harp
(74) *Attorney, Agent, or Firm*—Sughrue Mion, PLLC

(57) ABSTRACT

Device (1) for switching containers rotating about a fixed axis (10) of rotation and comprising, arranged peripherally around the axis (10) of rotation, a plurality of arms (7, 188) for gripping at least one container, each gripping arm (7, 188) comprising a cam follower (98, 186) for engagement in a cam raceway (91, 184), the raceway (91, 184) comprising at least one fixed section (111, 112, 115) and at least one removable section (120a, 120b, 194, 196) for a retractable cam, said device being characterized in that it comprises at least one rotary transverse plate (152, 153, 185) on which are fixed the radially mobile gripping arms (7, 188) and at least one fixed transverse plate (90a, 90b, 182) containing the raceway (91, 184) of the cam follower (98, 186) of the gripping arm (7, 188), and in that the removable section (120a, 120b, 194, 196) is retractable in a direction approximately parallel to the axis (10) of rotation by means of an actuator (140a, 140b) mounted on the fixed transverse plate (90a, 90b, 182).

14 Claims, 5 Drawing Sheets

U.S. PATENT DOCUMENTS

| | | | |
|---|---|---|---|
| 3,488,994 A | | 1/1970 | Messervey et al. |
| 3,687,285 A | * | 8/1972 | Messervey ................... 209/561 |
| 4,239,116 A | * | 12/1980 | Eisenberg et al. ........... 209/523 |
| 4,596,107 A | | 6/1986 | Pfleger, Sr. |
| 4,651,879 A | * | 3/1987 | Harris et al. ................ 209/523 |
| 5,581,975 A | * | 12/1996 | Trebbi et al. ............... 53/284.6 |
| 5,591,462 A | | 1/1997 | Darling et al. |
| 6,354,427 B1 | * | 3/2002 | Pickel et al. ............. 198/470.1 |
| 6,446,781 B1 | * | 9/2002 | De Villele ................... 198/364 |
| 6,513,643 B2 | * | 2/2003 | Nakada ....................... 198/379 |
| 6,779,651 B1 | | 8/2004 | Linglet et al. |
| 7,140,870 B2 | * | 11/2006 | Nava ........................... 425/534 |
| 7,140,871 B2 | * | 11/2006 | Evrard ........................ 425/540 |
| 7,434,857 B2 | * | 10/2008 | Nakajima et al. ............ 294/116 |
| 7,451,868 B2 | * | 11/2008 | Legallais et al. ......... 198/470.1 |
| 7,543,697 B2 | * | 6/2009 | Legallais .................. 198/478.1 |

FOREIGN PATENT DOCUMENTS

| | | |
|---|---|---|
| DE | 199 28 325 A1 | 12/2000 |
| FR | 2 867 171 A | 9/2005 |
| GB | 1 455 569 A | 11/1976 |

* cited by examiner

US 7,849,998 B2

CONTAINER SWITCHING DEVICE

TECHNICAL FIELD

The present invention relates to installations for transferring hollow bodies, such as containers, of the bottle or preform type, a preform in general being a substantially tubular object closed at one axial end and the opening of which has the finished shape of the neck of the ultimate hollow body, such as some form of bottle.

The invention finds an advantageous application in installations for the blow-molding of containers, in which installations preforms are fed into a thermal conditioning oven before being transferred to a blow-molding machine which comprises a great many blowing or stretch-blowing units with at least one mold, these units being mounted on a rotary machine of the carousel type. At the outlet of the blow-molding carousel, it is desirable to be able to eject from the stream of manufactured containers the very rare containers that do not conform, mainly those containers which have not been correctly molded or blown. Advantageously, these non-conforming containers need to follow a special path that allows them to be counted and allows their defects to be analyzed, this analysis being correlated against the values of the blowing parameters.

In other words, the invention will find applications in machines for conveying containers, especially by their neck. The advantageous application of the invention preferably relates to the separation of non-conforming bottles from a stream of bottles leaving a blowing or stretch-blowing machine, particularly bottles made of PET or PEN, although of course an installation according to the invention may be employed for other purposes. For example, the installation may allow a stream of items to be split into several streams which may or may not have the same delivery rate, this division into separate streams possibly or possibly not being associated with a feature of the items such as, for example, bottles. Thus, it is possible to separate the items such as bottles for example according to their color, their body shape, etc.

Furthermore, bearing in mind the ever increasing production rates, it is possible that the production rate of one of the work stations upstream may be higher than that of other work stations downstream. It would thus be advantageous to be able to route a stream of containers, for example coming from the blowing machine, toward two work stations downstream, for example labeling or marking stations, in order not to reduce the container production rate upstream.

It would therefore be particularly beneficial to be able to divide one stream of containers into several streams and distribute it toward other stations, whether this be toward another work station or toward a station for scrapping or ejecting blown containers, and to be able to do so at high production rates.

BACKGROUND OF THE INVENTION

Devices for ejecting non-conforming containers at the outlet of a blow-molding carousel are already known. U.S. Pat. No. 5,591,462 illustrates a machine belonging to the Applicant Company, provided with means of controlling the quality of the blown products, with a system for ejecting non-conforming containers. The containers are ejected, in the earlier machines of the Applicant Company, by a picker driven by a cylinder actuator. The high throughputs of the latest-generation blow-molding machines no longer allow effective use of this picker, because the actuating cylinder does not have a swift enough response time.

Document U.S. Pat. No. 3,488,994 also discloses a routing device of the type having a picker driven by an actuating cylinder. However, this embodiment is unable to achieve high routing rates for the containers routed using this device.

Document U.S. Pat. No. 4,596,107 also proposes a routing device in which the gripping arms follow a cam path on the periphery of a fixed transverse plate, a vertically retractable cam being able to intersect the runway in such a way as to route a second stream of containers toward a different outlet. However, this embodiment is relatively complicated and bulky to implement, particularly in terms of the means for retracting the retractable cam.

SUMMARY OF THE INVENTION

In order to solve the problems associated with the prior art, the present invention relates to a routing device for switching containers, rotating about a fixed axis of rotation and comprising a number of gripping arms for gripping at least one container, the arms being provided at the periphery about the axis of rotation, each gripping arm comprising a cam follower able to collaborate with a runway of a cam, the runway having at least one fixed section and at least one retractable-cam removable section, the retractable section, when in position, allowing at least one gripping arm to follow a path separate from that followed by the gripping arms when the retractable section is retracted from said runway, characterized in that it comprises at least one rotary transverse plate to which the radially movable gripping arms are attached and at least one fixed transverse plate in which the runway for the cam follower of the gripping arm is formed, and in that the removable section can be retracted more or less parallel to the axis of rotation by an actuator fixed to the fixed transverse plate.

According to this embodiment, it is thus possible to obtain a container routing rate that is higher than can be achieved with devices of the prior art while at the same time limiting the volume occupied by the means for retracting the retractable-cam section.

In order to produce a more compact routing device with a cam runway inside the plate in which the runway is formed rather than on the periphery of a fixed transverse plate, the retractable removable section is able at least partially to fill an opening in the fixed transverse plate.

In order to allow containers to be grasped and make it possible to form several container outlets, each gripping arm is mounted such that it can slide radially.

In order to guarantee that the gripping arms will return to their initial position before the gripping arms grasp the containers, the routing device according to the invention comprises means able to exert a radial contraction force on each gripping arm.

According to one advantageous embodiment, each gripping arm slides against the action of spring means.

Still according to an advantageous embodiment to allow the gripping arms to slide radially and to contract radially, each gripping arm is mounted such that it can slide, against the action of spring means, on a guide rail.

In order to allow the gripping arms to contract, the guide rail is able to slide in a shoe fixed to the rotary transverse plate.

In order to limit the space and volume occupied by the device according to the invention, the rotary transverse plate is positioned facing that face of the fixed transverse plate in which the runway for the roller of the gripping arm is formed.

In order to allow containers to be routed at a high rate, the actuator is of the double-acting cylinder type.

Advantageously, the fixed transverse plate comprises a section able to force the cam followers closer to the axis of rotation.

In order to allow containers to be grasped, each gripping arm comprises a gripping end shaped into a gripper borne by a support arm.

In order to allow one stream of containers to be separated into several streams, the gripping end shaped into a gripper is able to move past at least one container-guide lane.

In order to increase the rates at which the containers are produced and routed, the routing wheel comprises a first set of gripping arms, the movements of which are controlled by a runway formed in a lower fixed transverse plate, and a second set of gripping arms, the movements of which are controlled by a runway formed in an upper fixed transverse plate.

Advantageously, each gripping arm comprises stop means able to limit the sliding of the gripping arm.

According to a preferred embodiment of the fixed transverse plate, the runway comprises: a first angular sector corresponding to a movement of the gripping arms substantially in an arc of a circle; a second sector in which the rollers move closer to the axis of rotation of the ejection wheel, this movement being performed against the action of the springs; a third angular sector in which the rollers run in a groove away from the axis of rotation of the ejection wheel; a fourth angular sector, the plate being provided, between the third sector and the fourth angular sector, with a through-hole through which a moving cam that forms the retractable section passes.

BRIEF DESCRIPTION OF THE DRAWINGS

Other objects and advantages of the invention will become apparent in the course of the following description of some embodiments which are given by way of nonlimiting examples, this description being made with reference to the attached drawings in which.

Figure 1:
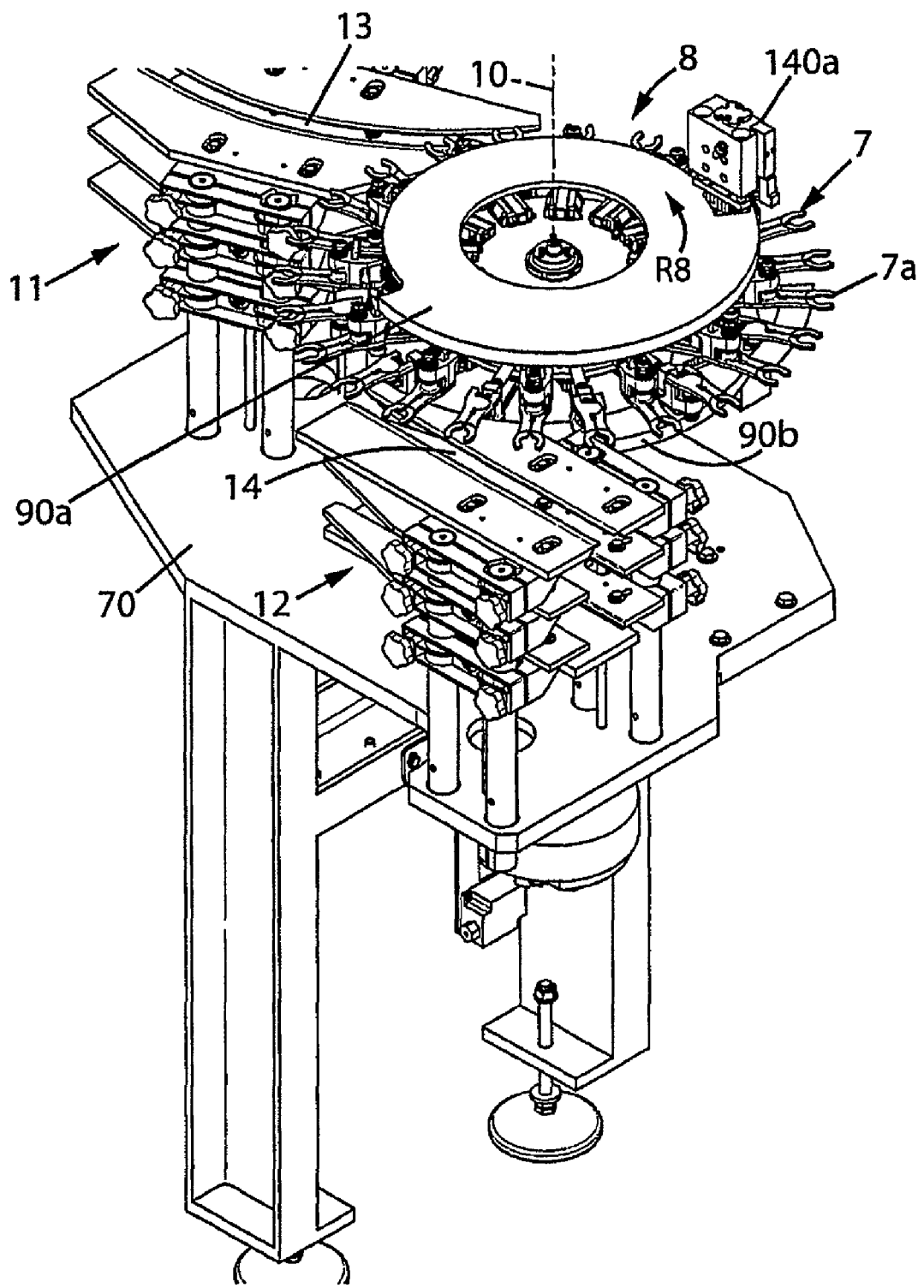
FIG. 1 is a perspective view of one embodiment of the invention.
Figure 2:
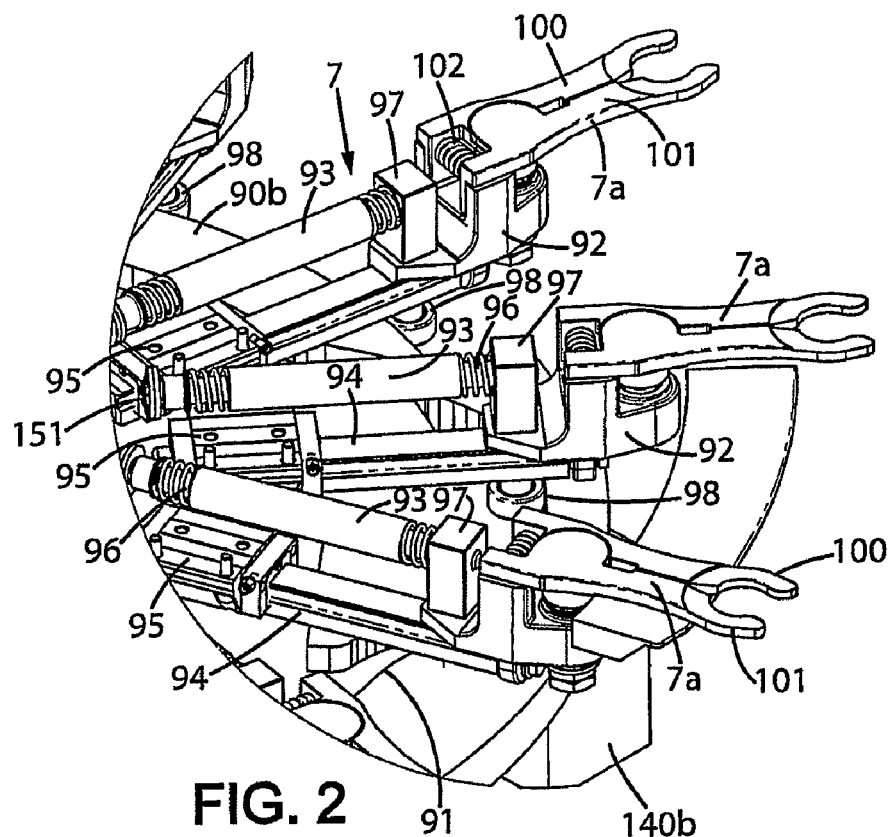
FIG. 2 is a perspective view of the gripping arms provided on the routing wheel.

DESCRIPTION OF THE PREFERRED
EMBODIMENT OF THE INVENTION

The present invention relates to a routing device 1 for switching containers, rotating about a fixed axis of rotation 10 and comprising a number of gripping arms 7 for gripping at least one container, the arms being provided at the periphery about the axis of rotation 10.

The device 1 according to the invention is in the form of a routing wheel 8 preferably allowing some of the containers to be ejected to a scrapping area or testing area. The routing wheel 8 allows containers of the bottle type to be conveyed to at least two outlets 11, 12 each comprising a guide lane 13, 14, means for altering the path of the gripping arms 7 of the routing wheel 8 in order to position these gripping arms 7 in vertical alignment with the guide lanes 13, 14 of the containers.

By following the direction of rotation R8 of the routing wheel 8, the gripping end 7a of the gripping arms 7 is selectively brought to face the first outlet 11, at the entry to the first guide lane 13. The containers or items, preferably bottles, borne by these ends 7a then leave these ends 7a to be conveyed by this first guide lane 13. This first path is, for example, that of the bottles which do conform. The end 7a of each gripping arm 7 is in the form of a gripper.

Means allow some of the gripping arms 7 to be diverted selectively so that the ends 7a of these arms 7 do not come to face the first outlet 11 but come to face the second outlet 12, at the entry to the second guide lane 14. This second path is, for example, that of the non-conforming bottles, the second guide lane 14 opening into a collection basket (not depicted).

Figure 6:
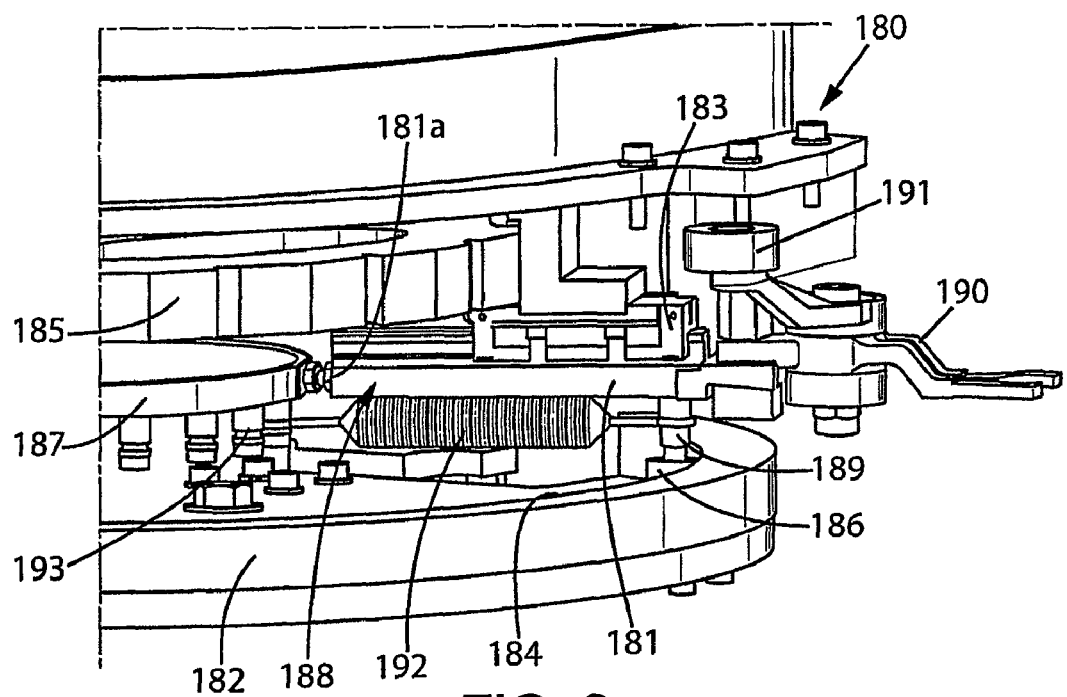
FIG. 6 is a perspective view of another embodiment of a routing device in which the gripping arms are subjected to tensile forces, just one arm having been depicted for reasons of clarity.
Figure 7:
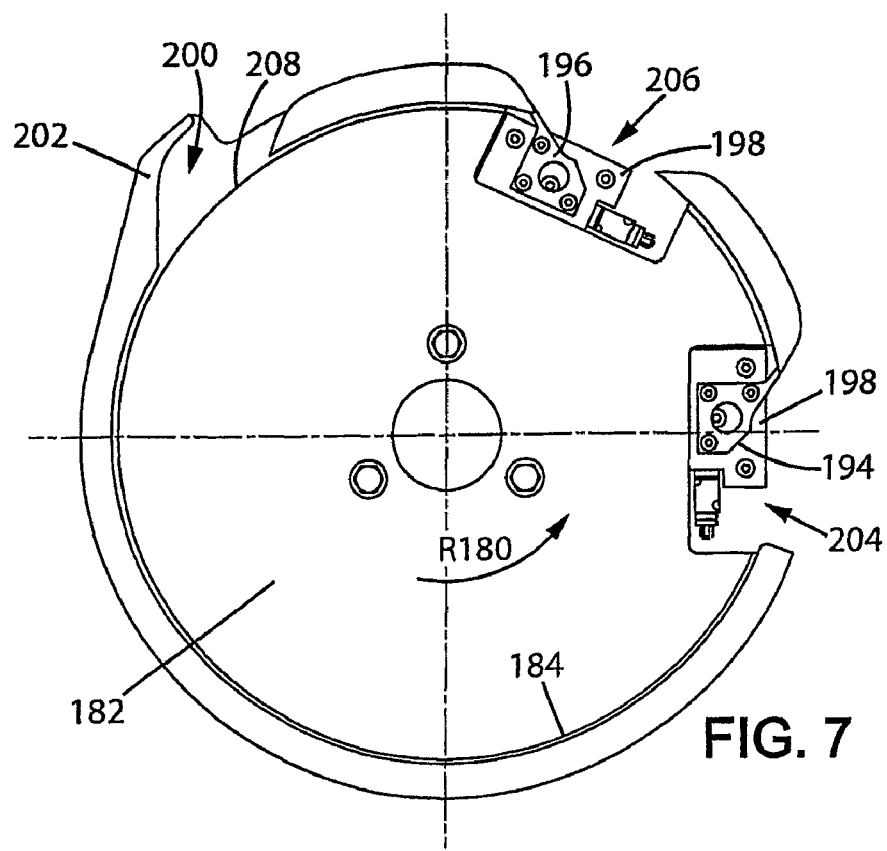
FIG. 7 is a view from above of a plate supporting the runway for the rollers of the gripper supports of the routing wheel according to the second embodiment of the invention.
Figure 8:
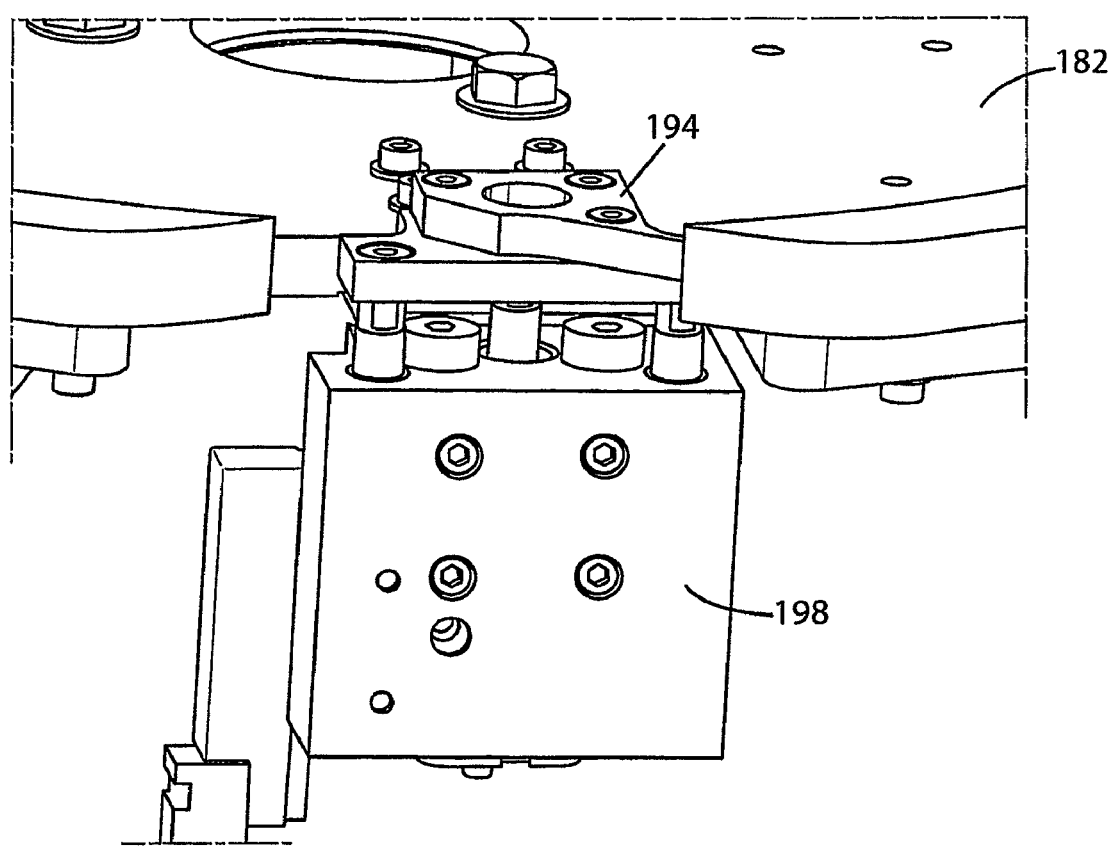
FIG. 8 is an enlarged perspective view of a retractable-cam section region incorporated into the plate according to the second embodiment of the routing wheel.

In the embodiment depicted, there are just two guide lanes 13, 14 provided for removing the items from the routing wheel 8. In order for all the gripping ends 7a of the gripping arms 7 to be able to face the second outlet 12, the containers which have not left the gripping ends 7 to enter the first guide lane 13 have of necessity to leave the routing wheel 8 to enter the second guide lane 14. As will be obvious to those skilled in the art from reading the remainder of this description, a routing device according to the invention may comprise more than two outlet lanes for the items or containers carried by the routing wheel. It is thus possible to separate the containers into two or more than two distinct streams. The second embodiment of the invention as illustrated in FIGS. 6 to 8 and which will be described in greater detail hereinbelow discloses a routing wheel such as this able to route a stream of containers into three distinct streams.

It should be noted that the containers of the bottle type are conveyed substantially in the same plane from the entry to the routing wheel 8 to the first outlet 11 or the second outlet 12, the guide lanes 13, 14 also keeping these containers in the same conveying plane.

The routing wheel 8 is mounted on a shaft borne by a chassis 70 which also supports the two guide lanes 13, 14.

The routing wheel 8 comprises a plurality of radially movable gripping arms in the form of twenty-four substantially identical and equidistant gripping arms 7. A fixed upper plate 90a and a fixed lower plate 90b which are transverse to the axis of rotation 10 of the routing wheel 8 each form a support for a runway 91. Each gripper-shaped gripping end 7a of the gripping arm 7 is borne by a support arm 92, each gripping arm 7 therefore comprises a support arm 92 and a gripping end 7a supported by the support arm 92.

Even though the invention is described and illustrated in respect of two fixed transverse plates 90a, 90b each defining a runway 91 for a gripping arm 7, it must be clearly understood that the operating principle of the routing wheel 8 remains identical if there is just one fixed transverse plate 90a, 90b and just one rotary transverse plate 152, 153 to which the gripping arms 7 are attached.

Figure 3:
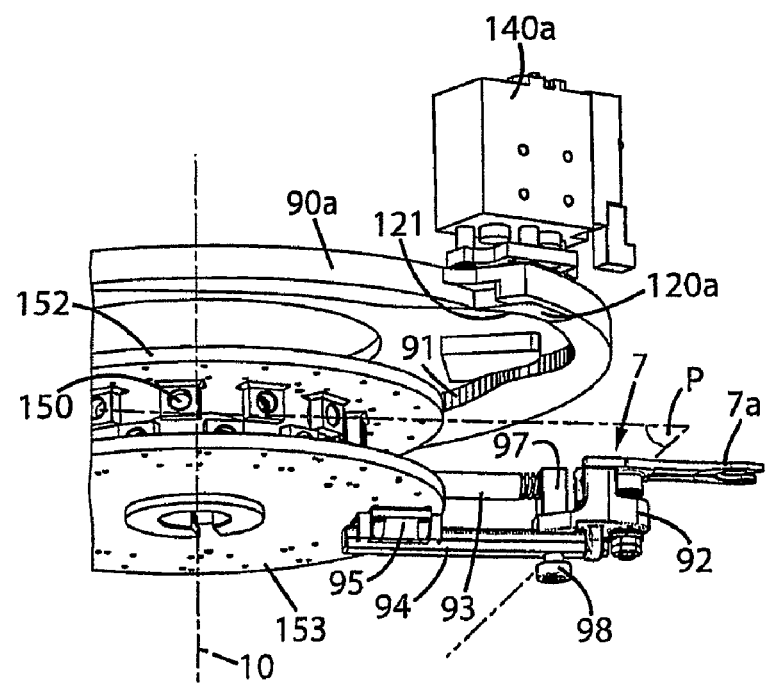
FIG. 3 is a partial perspective view of a gripping arm fixed to a lower rotary plate.
Figure 4:
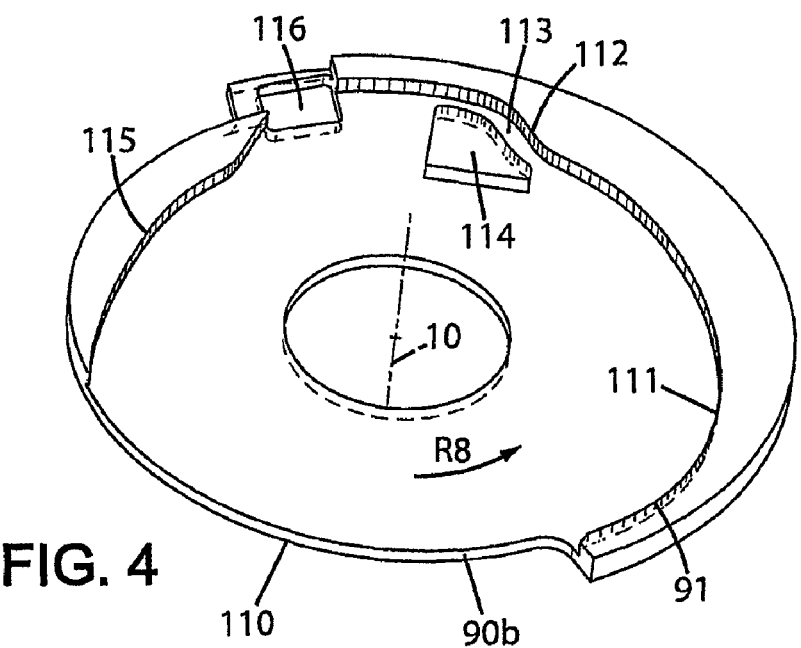
FIG. 4 is a perspective view of a fixed transverse plate in which the runway for the rollers of the gripper support arms of the routing wheel is formed, this plate having an opening for fitting a retractable cam.

The support arm 92 is mounted such that it can slide, against the action of a spring 93, on a guide rail 94. Each guide rail 94 is mounted on the rotary transverse plate 152, 153, as illustrated in FIG. 3, via a shoe 95, which is fixed to the rotary transverse plate 152, 153. The spring 93 is mounted coaxial with a guide pin 96 and exerts pressure on a stop 97, this stop 97 forming a support for the guide pin 96 and also forming a support for a roller 98. It is this roller 98 which will run along the runway 91, against the action of the spring 93.

Depending on the position of the roller 98 on the runway 91 and therefore on the distance between the roller 98 and the axis of rotation 10, the contraction of the spring 93 will be more or less pronounced and the guide rail 96 will slide to a greater or lesser extent within the shoe 95.

The gripper-shaped gripping end 7a comprises two half-grippers 100, 101 and a spring 102, and their opening movement is performed against the action of the spring 102 by the pivoting of one half-gripper 100, 101 with respect to the other, the pivot axis being substantially parallel to the axis of rotation of the roller 98 of the gripper support 92.

The runway 91 of each fixed transverse plate 90a, 90b comprises a first angular sector 110 corresponding to the gripping arms 7 moving substantially in an arc of a circle. Following the direction of rotation of the routing wheel 8 (as indicated by the arrow R8), the runway 91 comprises, following on from the first sector 110, a second sector 111 in which the rollers 98 move closer to the axis of rotation 10, this movement being performed against the action of the springs 93, causing them to contract. Still following the direction of rotation of the routing wheel 8, the runway 91 comprises a third angular sector 112 in which the rollers 98 run in a groove 113 delimited, toward the inside of the fixed transverse plate 90a, 90b, by a projection 114. When the rollers 98 are running in the groove 113, they move away from the axis of rotation 10 of the routing wheel 8 which means that the corresponding gripping ends 7a also move away from this axis of rotation 10. Still following the axis of rotation of the routing wheel 8, the runway 91 bears a fourth angular sector 115.

Figure 5:
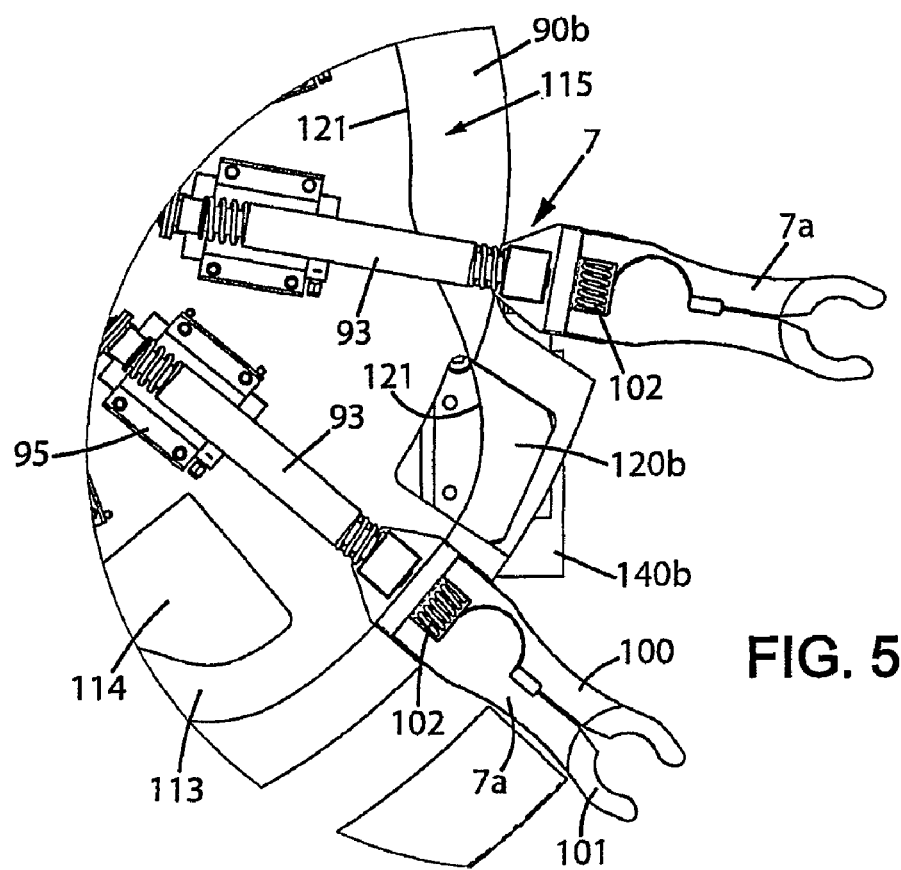
FIG. 5 is an enlarged partial top view of the region of the lower plate of the routing wheel with the retractable-cam section.

Between the third sector 112 and the fourth angular sector 115, the plate 90a, 90b is provided with a through-hole 116 through which, at the appropriate time, a moving cam 120a, 120b passes, as depicted in FIGS. 3 and 5.

When this moving cam 120a, 120b is absent, the rollers 98 leave the third section 112 of the runway 91 and describe an arc of a circle over the entire fourth section 115, to come into line with the entry to the first guide lane 13.

When the moving cam 120a, 120b is in place, the rollers 98 come to bear against a runway surface 121 and the corresponding gripping ends 7a therefore move closer to the axis of rotation 10 of the routing wheel 8. As a result, these gripping ends 7a do not come into line with the first guide lane 13. When the rollers 98 of these gripping ends 7a enter the first angular sector 110, these gripping ends 7a revert to the path common to all the gripping ends 7a. The bottles, for example those which do not conform, borne by these gripping ends 7a are thus picked out as they enter the second guide lane 14.

The routing wheel 8 comprises a first set of gripping arms 7, the movements of which are controlled by a lower runway 91 of a lower plate 90b and a lower moving cam 120b, each gripping arm 7 then being attached via the shoe 95 to the lower rotary transverse plate 153, and a second set of gripping arms 7, the movements of which are controlled by an upper runway 91 of an upper plate 90a and an upper moving cam 120a, each gripping arm 7 then being attached via the shoe 95 to an upper rotary transverse plate 152. Control of the movements of the second set of gripping arms 7 is similar to that of the first set of gripping arms 7. Through this arrangement it is possible, for the same radius of routing wheel 8 and the same rotational speed, to double the number of gripping arms 7 on the routing wheel 8 and therefore double the rate at which bottles conveyed by the routing wheel 8 can be delivered. Advantageously, each moving cam 120a, 120b has its own actuator, such as a double-acting cylinder actuator 140a, 140b for example, the actuator being provided on the external face of the fixed transverse plate 90a, 90b. In the embodiment depicted, the routing wheel 8 has overall symmetry with respect to a transverse plane P (see FIG. 3) situated more or less mid-way between the two runways 91 of the upper and lower fixed transverse plates 90a, 90b. FIG. 3 shows the housings 150 for the proximal ends 151 of the guide pins 96. These housings 150 are secured to the two annular rotary transverse plates 152, 153, these being the upper and lower plates, respectively, of axis 10, the entirety of these two rotary secondary plates 152, 153 being housed between the fixed upper transverse plate 90a (which defines the runway 91 for the rollers 98 of the first group of gripping arms 7) and the fixed lower transverse plate 90b (which defines the runway 91 for the rollers 98 of the second group of gripping arms 7). An actuator, for example a double-acting cylinder actuator 140a, 140b controls the movement of the retractable cam 120a, 120b through the through-hole (or opening) 116 in the fixed upper transverse plate 90a. Likewise, an actuator, for example a lower double-acting cylinder actuator 140b, controls the movement of the retractable cam 120a, 120b through the through-hole 116 in the fixed lower transverse plate 90b.

Advantageously, the routing device according to the invention has, in succession, a gripping arm 7 from the first group on the fixed upper transverse plate 90a, then a gripping arm 7 from the second group on the fixed lower transverse plate 90b, a gripping arm 7 from the fixed lower transverse plate 90b being flanked on each side by a gripper 7 from the fixed upper transverse plate 90a and, conversely, the gripping arms 7 being, when viewed from above, substantially equidistant, the same angular arc separating two successive gripping arms 7.

Because the gripping ends 7a come to face the entries 11, 12 of the lanes 13, 14 according to whether or not the retractable-cam section 120a, 120b is present, the body of the containers of the bottle type therefore enter the corresponding lane 13, 14, thereby forcing the body of the containers away from the axis 10 of the routing wheel 8, thus causing the gripping ends 7a to open.

It should be noted that in present-day container blow-molding machines, an optical inspection is performed on each container of the bottle type as it leaves the blow-molding machine. Given the high throughput (of the order of twenty containers per second), the image-processing time, and the need for the machines to be compact, very little time must, under ideal conditions, separate detection of a container that does not conform, and its ejection from the stream.

Because conveying is performed using individual item supports, such as grippers, ejecting a single container of the bottle type is thus possible. By contrast, conventional ejectors positioned on an air conveyor remove more than one bottle.

FIG. 6 depicts a partial perspective view of a second possible embodiment of a routing wheel 180 according to the invention, with a direction of rotation R180, comprising at least one fixed lower transverse plate 182 internally defining a cam path 184 for a follower roller 186 belonging to a gripping arm 188 able, using a gripper-shaped gripping end 190, to grasp a container of the bottle type, the opening and closing of the gripper 190 being controlled by a cam and roller system 191 of a type known per se.

The gripping arm 188, according to this embodiment, comprises spring means 192 able to exert a radial tensile force allowing the follower roller 186 to be kept a substantially constant distance away from the axis of rotation of the routing wheel 180 and more or less corresponding to the distance between the axis of rotation and the inner cam path 184 of the routing wheel 180.

In order to allow the follower roller 186 to move away from the axis of rotation, the routing wheel 180 comprises two retractable-cam sections 194, 196 able to intersect the path of the roller 186 along the inner cam path 184 and to stretch the spring means 192 of the gripping arm 188 in such a way that the roller 186 leaves the routing wheel 180 so that the container carried by the gripper-shaped gripping end 190 of the gripping arm 188 enters a guide lane, for example of the type as previously described.

According to this second embodiment, each gripping arm 188 comprises a guide rail 181 able to slide in a guide shoe 183 attached to a rotary transverse plate 185, the guide rail 181 having an end 181*a* able to butt against bearing means in the form of a second rotary plate 187 provided between the fixed lower plate 182 and the rotary transverse plate 185.

The spring means 192 are in the form of a spring, one hooked end of which is hooked onto a rod 189 provided on the guide rail 181, to which rod the cam follower roller 186 is freely attached, and the other hooked end of which spring is attached to a lug 193 provided on the second rotary plate 187.

Each cam section 194, 196 is axially retractable (that is to say can be retracted more or less parallel to the axis of rotation of the routing wheel 180) by an actuator 198 of the same type as described previously, for example an actuator of the double-acting hydraulic or pneumatic cylinder actuator type.

In addition, the routing wheel 188 also has stop means 200 able to return the spring means 192 of the gripping arm 188 into the contracted position with the follower roller 186 against the inner cam path 184 of the routing wheel 180.

The stop means 200 are in the form of a protrusion 202 against which the roller 186 butts and is able to access the inner cam path 184 of the routing wheel 180. Because of the presence of this protrusion 202, it is thus possible for the routing device to be operated even if the spring means 192 break, it being possible for the gripping arm 188 to be contracted into its initial position either by the spring means 192 or by the protrusion 202 which forces the roller 186 to return against the runway 184 of the fixed transverse plate 182.

According to this embodiment, the routing wheel 180 has three angular sections forming discontinuities 204, 206, 208 of the inner cam path 184, the first discontinuity 204 corresponding to the site of the first retractable-cam section 194 and thus forming an opening 204 in the transverse plate 182, the second discontinuity 206 corresponding to the site of the second retractable-cam section 196 and thus forming an opening 206 in the transverse plate 182, and the third discontinuity 208 corresponding to the site of the protrusion 202 and to the discontinuity through which the roller 186 is able to return by rolling against the inner cam path 184.

It is thus possible according to this second embodiment to divide one and the same stream of containers into three streams, a first stream consisting of containers, the gripping arms 188 of which have come into abutment against the first cam section 194, a second stream consisting of containers, the gripping arms 188 of which have come into abutment against the second cam section 196, and a third stream consisting of containers, the gripping arms 188 of which have not come into abutment against the first or second retractable-cam sections 194, 196.

In other words and to sum up, the present invention relates to a routing device 1 for switching containers, rotating about a fixed axis 10 of rotation and comprising a number of gripping arms 7, 188 for gripping at least one container, the arms being provided at the periphery about the axis 10 of rotation, each gripping arm 7, 188 comprising a cam follower 98, 186 able to collaborate with a runway 91, 184 of a cam, the runway 91, 184 having at least one fixed section 111, 112, 115 and at least one retractable-cam removable section 120*a*, 120*b*, 194, 196, the retractable section 120*a*, 120*b*, 194, 196, when in position, allowing at least one gripping arm 7, 188 to follow a path separate from that followed by the gripping arms 7, 188 when the retractable section 120*a*, 120*b*, 194, 196 is retracted from said runway 91, 184, characterized in that it comprises at least one rotary transverse plate 152, 153, 185 to which the gripping arms 7, 188 are attached and at least one fixed transverse plate 90*a*, 90*b*, 182 in which the runway 91, 184 for the cam follower 98, 186 of the gripping arm 7, 188 is formed, and in that the removable section 120*a*, 120*b*, 194, 196 can be retracted more or less parallel to the axis 10 of rotation by an actuator 140*a*, 140*b* fixed to the fixed transverse plate 90*a*, 90*b*, 182.

The retractable section 120*a*, 120*b*, 194, 196 is able at least partially to fill an opening 116, 204, 206 in the fixed transverse plate 90*a*, 90*b*, 182.

In effect, according to the first embodiment illustrated in FIGS. 1 to 5, the retractable-cam section 120*a*, 120*b* can be partially inserted in the hole or the opening 116 and also fills the opening in the runway 91 of the fixed transverse plate 90*a*, 90*b* whereas according to the second embodiment illustrated in FIGS. 6 to 8, each of the retractable-cam sections 194, 196 can be partially inserted in an opening or a discontinuity 204, 206 formed in the transverse plate 184. It is thus possible by virtue of the invention to form runways inside plates and therefore to reduce the overall space occupied by such a container routing device while at the same time increasing the rate at which the containers can be routed.

Each gripping arm 7, 188 is mounted such that it can slide radially, preferably against the action of spring means 93, 192 and more preferably still on a guide rail 94, 181, and the routing device according to the invention comprises means 93, 192, 202 able to exert a radial contraction force on each gripping arm 7, 188. In the case of the first embodiment, these means are spring means 93, whereas in the second embodiment, these means may be either the spring means 192 or the presence of the protrusion 202 on the edge of the fixed transverse plate 184, or a combination of both.

The guide rail 94, 181 is able to slide in a shoe 95, 183 fixed to a rotary secondary plate 152, 153, 185 which is positioned facing that face of the fixed transverse plate 90*a*, 90*b*, 182 in which the runway 91, 184 for the roller 98, 186 of the gripping arm 7, 188 is formed.

The retractable section 120*a*, 120*b*, 194, 196 is set in motion by an actuator 140*a*, 140*b* of the double-acting cylinder actuator type.

The fixed transverse plate 90*a*, 90*b*, 182 comprises a section 115, 202 able to force the cam followers 98, 186 closer to the axis 10 of rotation.

Each gripping arm 7, 188 comprises a gripping end 7*a*, 190 shaped into a gripper borne by a support arm 92.

The gripping end 7*a*, 190 shaped into a gripper is able to move past at least one container-guide lane 13, 14.

Each gripping arm 7, 188 comprises stop means 97, 187 able to limit the sliding of the gripping arm 7, 188.

The invention claimed is:

1. A routing device for switching containers, the routing device rotating about a fixed axis of rotation and comprising:
   a number of gripping arms for gripping at least one container, the arms being provided at the periphery about the axis of rotation;
   a first path;

a second path separate from the first path;

a runway of a cam, each of said gripping arms comprising a cam follower collaborating with said runway, the runway having at least one fixed section and at least one removable section provided with a retractable-cam for allowing the removable section to be moved between a nominal position and a retracted position where the removable section is retracted from said runway, wherein the removable section, when in said nominal position, allows at least one of the gripping arms to follow the first path, while in said retracted position, the removable section allows at least one of the gripping arms to follow the second path;

at least one rotary transverse plate to which the radially movable gripping arms are attached;

a first fixed transverse plate in which the runway for the cam follower of the gripping arm is formed;

an actuator fixed to the first fixed transverse plate for actuating a displacement of said removable section substantially parallel to the axis of rotation, from the nominal position to the retracted position; and a second fixed transverse plate in which another runway is formed; and wherein the gripping arms comprise a first set of gripping arms, the movements of which are controlled by the runway formed in the first fixed transverse plate, which is on one of a lower and upper fixed transverse plate, and a second set of gripping arms, the movements of which are controlled by a runway formed in the second fixed transverse plate, which is on the other of the lower and upper fixed transverse plate.

2. The routing device as claimed in claim 1, wherein the first fixed transverse plate comprises an opening and the removable section is configured at least partially to fill the opening in the fixed transverse plate.

3. The routing device as claimed in claim 1, wherein each gripping arm is mounted such that it can slide radially.

4. The routing device as claimed in claim 1, comprising means for exerting a radial contraction force on each gripping arm.

5. The routing device as claimed in claim 1, wherein each gripping arm slides against the action of a spring device.

6. The routing device as claimed in claim 1, wherein each gripping arm is mounted so as to slide, against the action of a spring device, on a guide rail.

7. The routing device as claimed in claim 6, wherein said guide rail is configured to slide in a shoe fixed to the rotary transverse plate.

8. The routing device as claimed in claim 1, wherein the rotary transverse plate and the first fixed transverse plate have respective faces facing each other a certain distance apart, one of these faces being that face of the first fixed transverse plate in which the corresponding runway for the cam follower of the gripping arm is formed.

9. The routing device as claimed in claim 1, wherein the actuator is of the double-acting cylinder type.

10. The routing device as claimed in claim 1, wherein the first fixed transverse plate comprises a section configured to force the cam followers closer to the axis of rotation.

11. The routing device as claimed in claim 1, wherein each gripping arm comprises a gripping end shaped into a gripper borne by a support arm.

12. The routing device as claimed in claim 11, wherein the gripping end shaped into a gripper is configured to move past a container-guide lane.

13. The routing device as claimed in claim 1, wherein each gripping arm comprises a stopping device that limits the sliding of the gripping arm.

14. The routing device as claimed in claim 1, wherein the runway formed in the first fixed transverse plate comprises:

a first angular sector corresponding to a movement of the gripping arms substantially in an arc of a circle, a second sector in which the rollers move closer to the axis of rotation, this movement being performed against the action of the springs device;

a third angular sector in which the rollers run in a groove away from the axis of rotation, a fourth angular sector, the first fixed transverse plate being provided, between the third sector and the fourth angular sector, with a through-hole through which a moving cam that forms said removable section passes.

* * * * *